March 2, 1948. C. E. KERR 2,436,812
FILLING MACHINE
Filed May 12, 1944 2 Sheets-Sheet 1
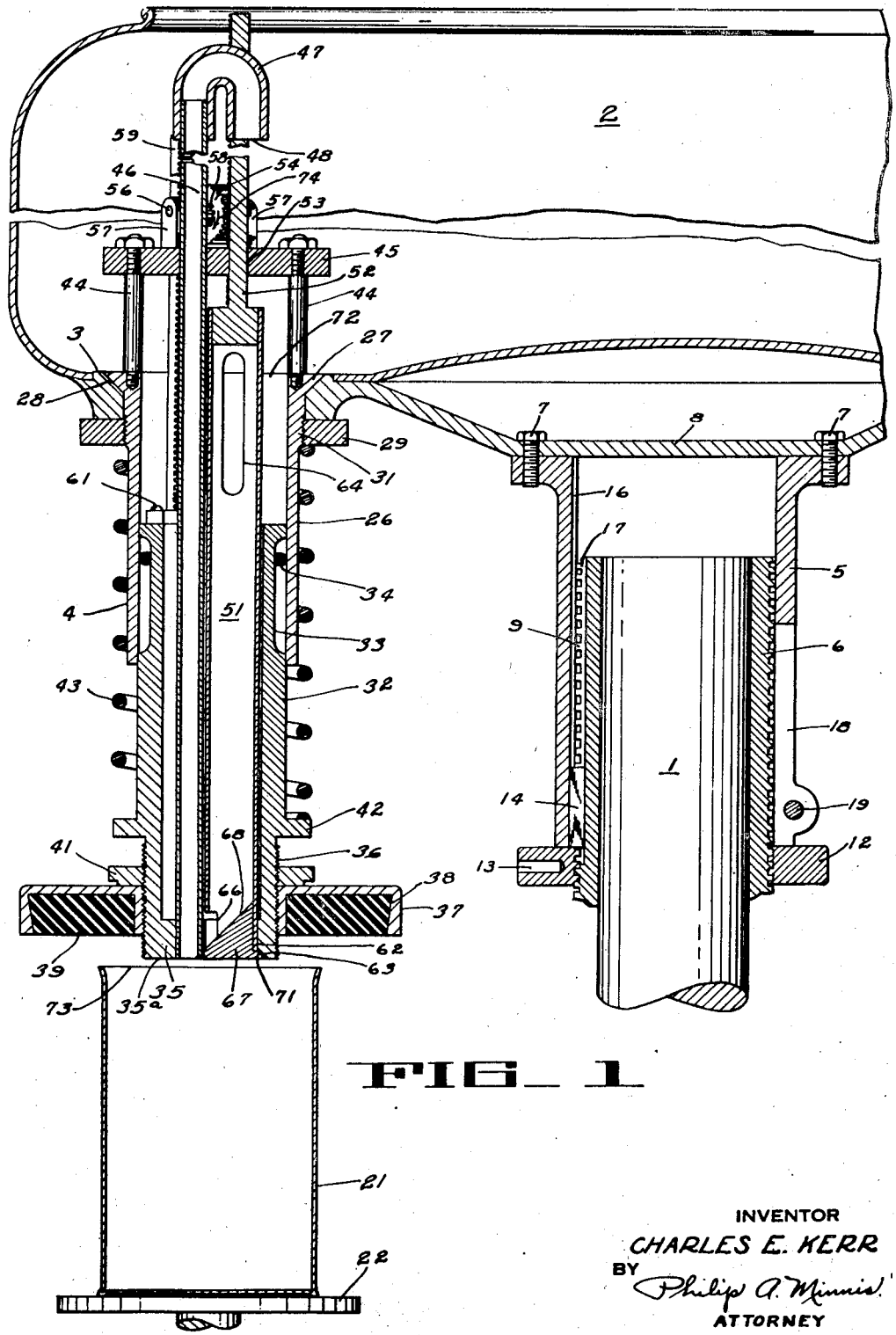
FIG_1
INVENTOR
CHARLES E. KERR
BY
ATTORNEY March 2, 1948.　　C. E. KERR　　2,436,812
FILLING MACHINE
Filed May 12, 1944　　2 Sheets-Sheet 2
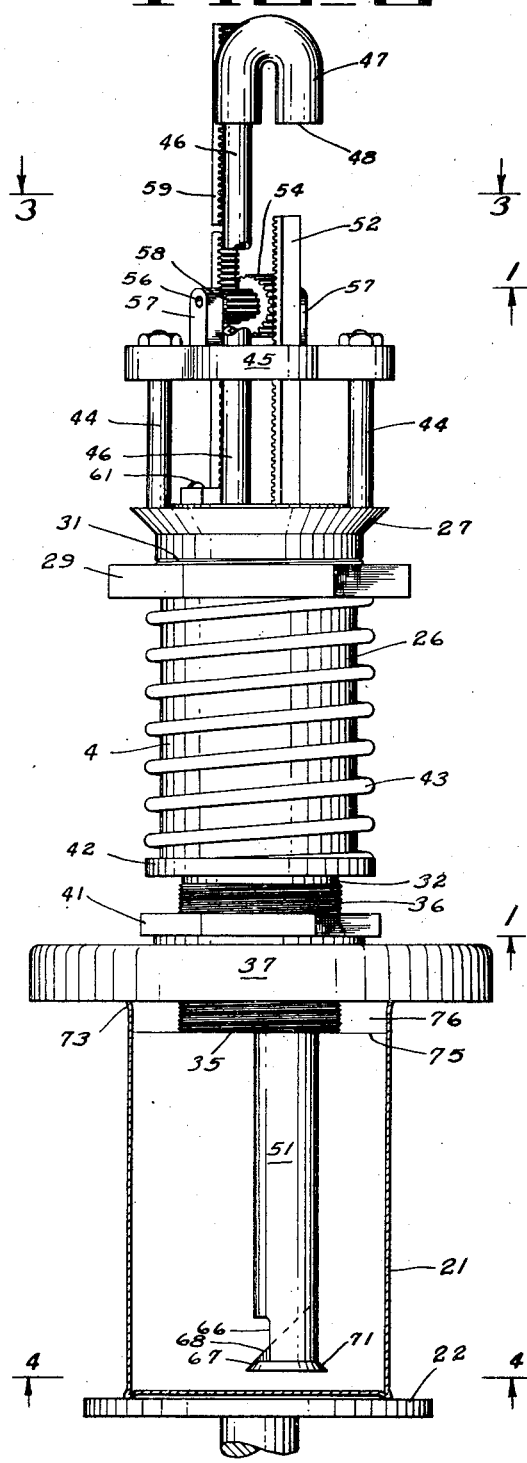
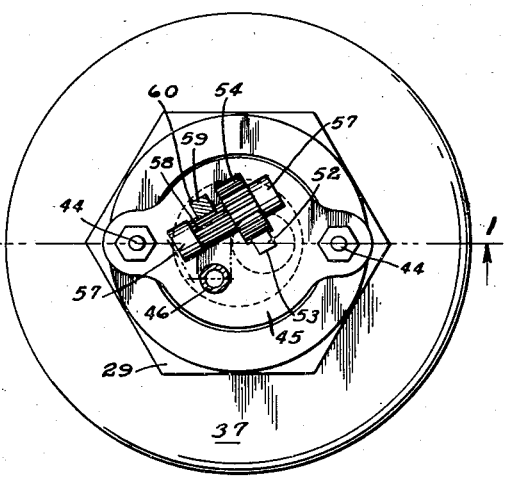
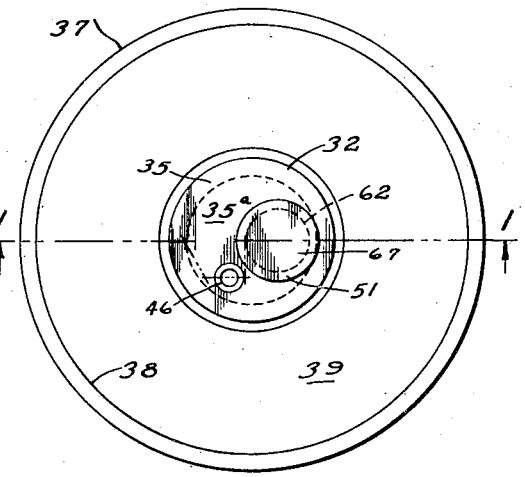
INVENTOR
CHARLES E. KERR
BY *Philip A. Minnis*
ATTORNEY Patented Mar. 2, 1948

2,436,812

UNITED STATES PATENT OFFICE 2,436,812

FILLING MACHINE

Charles E. Kerr, Hoopeston, Ill., assignor to Food Machinery Corporation, San Jose, Calif., a corporation of Delaware Application May 12, 1944, Serial No. 535,252

20 Claims. (Cl. 226—98)

1

The present invention appertains to filling machines for filling liquids into containers such as tin cans, or the like, and relates more particularly to an improved bottom filling valve for such machines.

The bottom filling of containers is well known in the art. However, in filling valves heretofore used for this purpose the filling tube is stationary and the container is first lifted a distance approximately equal to the height of the container in order to bring the discharge end of the filling tube near the bottom of the container during filling thereof and subsequently the container is lowered the same distance to remove the filling tube from the container after the same has been filled, as disclosed in my co-pending application Ser. No. 306,112 for Filling valve, filed November 25, 1939, now Patent 2,348,480, issued May 9, 1944. The distance the container is lifted and lowered is so great that it requires about 30% of the time of the filling cycle of the machine. To overcome this disadvantage the filling valve of the present invention has been designed. In employing this valve structure the time of each filling cycle of the machine is considerably shortened and the distance of raising and lowering of the container is reduced to a minimum.

It is therefore an object of the present invention to provide a filling valve for filling machines wherein the height of the container to be filled determines the distance the filling tube of the valve enters the container.

Another object is to provide a filling valve for filling machines wherein the filling tube of the valve enters the container to be filled to a predetermined position from the bottom thereof irrespective of the height of the container.

Another object is to provide a filling valve for filling machines wherein the filling tube is projected into and lifted out of the container at a speed exceeding the speed of movement of the container into and out of filling position.

Another object is to provide a filling valve for filling machines wherein the distance of travel of the filling tube into and out of filling position is greater than the distance of travel of the container into and out of filling position.

Another object is to provide a foam preventing filling valve for filling machines which requires a minimum amount of lift of the container to filling position.

Another object is to provide a simple and effective foam preventing filling valve for filling machines which increases considerably the output of the filling machine.

2

Other and further objects and advantages of the present invention will become apparent from the following description and drawings in which:

Fig. 1 is a section through a portion of a rotary filling machine and the filling valve of the present invention illustrated in connection therewith; the valve being shown in closed position with a container therebeneath in non-filling position.

Fig. 2 is a side view of the filling valve shown in Fig. 1 and a portion of the can holder of the machine. A container illustrated in section being shown in filling position, certain parts being broken away.

Fig. 3 is a section of Fig. 2 taken along lines 3—3 thereof.

Fig. 4 is a section of Fig. 2 taken along lines 4—4 thereof, the container being omitted.

The filling valve of the present invention is designed for use in connection with well known types of filling machines, such as that disclosed in Patent No. 1,355,015 to Thompson, dated October 5, 1920, wherein the containers to be filled are lifted and lowered into and out of engagement with the filling valve to effect opening and subsequent closing thereof. A portion of this type of machine has been illustrated in Fig. 1 wherein 1 designates the rotatable shaft of a rotary filling machine which supports the filler bowl or tank 2, wherein a supply of liquid is maintained at a predetermined level. Mounted on the bottom 3 of the tank near the periphery thereof are a plurality of filling valves 4, only one of which is shown in Fig. 1. In order to accommodate the machine to containers of different height, the tank 2 is adjustably mounted on shaft 1 by means of a sleeve 5 which is slidably disposed on a sleeve 6 fixed to the upper end of the shaft 1. The sleeve 5 is secured by screws 7 to a flange 8 which forms a part of the tank structure 2. The sleeve 6 is provided with an exterior square thread 9 upon which an adjustment nut 12 is threaded which engages the lower end of the sleeve 5, so that upon rotation of the nut 12 in one or the other direction, the sleeve 5, tank 2 and valve 4 are raised or lowered as desired. The nut 12 is preferably provided with sockets 13 to permit easy adjustment thereof by a socket wrench or the like.

A key 14 mounted in matching vertical keyways 16 and 17 in the interior surface of the sleeve 5 and the exterior surface of the sleeve 6, respectively, prevents rotation of the sleeve 5 and tank 2 relative to the shaft 1. The sleeve 5 is slotted as shown at 18 and is tightly clamped upon the sleeve 6 by means of a clamp bolt 19 in order to lock the tank securely to the shaft 1 after it has been adjusted to the desired height.

The cans or containers 21 rest upon vertically movable can holders or supports 22 which in turn are carried by a rotating turret of the machine in the usual well known manner. The turret, the means for rotating it, and the means for raising and lowering the can holders 22, do not form a part of the present invention and have been omitted from the drawings. It should be understood however that in conformity with the usual practice in machines of this type, the turret, shaft 1 and tank 2 rotate in unison carrying the can holders 22 and valves 4 in a circular path, there being one valve above each can holder in vertical alignment therewith. All can holders and valves are of identical construction and only one of the can holders 22 and valve 4 has therefore been illustrated and described herein.

After each can is moved into position on its respective holder and while it is carried thereby around said circular path, the holder is first elevated and then lowered to move the cans into and out of filling position as illustrated in Figs. 2 and 1, respectively.

The filling valve 4 of the present invention comprises a tubular housing 26 provided with a flange 27 at its upper end which is seated in a counterbored recess 28 in the bottom 3 of the tank. A lock nut 29 is screwed upon a threaded portion 31 on the outside of the housing 26 beneath the bottom of the tank and holds the housing 26 in fluid tight connection therewith. Vertically slidable within the housing 26 is a sleeve 32 provided with an annular recess 33 in which a sealing ring 34 is disposed to prevent leakage between the housing and sleeve. The lower end of the sleeve 32 is closed by a bottom wall 35 and the exterior of the lower end of the sleeve is threaded as shown at 36 and screwed thereon is a horizontally disposed circular lift plate 37 provided with an annular recess 38 within which a resilient annular pad or gasket 39 is mounted against which the top rim of the can 21 seats when the can is raised to filling position. A lock nut 41 is employed to lock the lift plate in any desired position with the free end of the sleeve 32 projecting more or less below the gasket 39. The free end of the sleeve 32, which projects below the lift plate 37 and gasket 39 serves as a displacement body within the top of the can to prevent overfilling thereof and to provide any desired head space in the filled can in a manner well known in the art.

Surrounding the housing 26 and sleeve 32 and interposed between the nut 29 and an annular shoulder 42 of the sleeve 32 is a coil spring 43 normally holding the sleeve 32 in its lowermost position as shown in Fig. 1.

As the can 21 is raised by the elevation of its holder 22 from non-filling position shown in Fig. 1 to filling position illustrated in Fig. 2 during the operation of the machine, the rim of the can is first brought into fluid tight contact with the gasket 39 of the lift plate 37 and thereupon the lift plate 37 and sleeve 32 are raised against the tension of the coil spring 43 causing telescoping of the sleeve 32 into the tubular housing 26. When the can is subsequently lowered by the holder 22 to nonfilling position the sleeve 32 returns to its original position as shown in Fig. 1 under the combined action of its own gravity and the force of the spring 43.

Positioned within the tank 2 and secured to the upper end of the tubular housing 26 by means of posts 44 is a head or bearing plate 45 within which a vent tube 46 is slidably mounted. This vent tube 46 extends downwardly through the housing 26, sleeve 32 and the bottom wall 35 of the sleeve within which the lower end of the vent tube is fixed. The lower open end of the vent tube 46 is flush with the lower face 35a of the bottom wall 35 (see Fig. 1). The upper end of the vent tube 46 extends upwardly beyond the head plate 45 and is provided with a return bend 47, the open end 48 of which is positioned above the liquid level in the tank.

From the above it is therefore apparent that the vent tube 46 moves up and down with the sleeve 32 and provides a vent for the escape of air from the top of the can while the latter is being filled.

Arranged for vertical movement within the sleeve 32 and housing 26 is a filling tube 51 to the upper end of which a rack 52 of rectangular cross section is secured. This rack is slidably mounted within a rectangular guide aperture 53 of the head plate 45 and the teeth of this rack intermesh with the teeth of a pinion 54 keyed to a shaft 56 rotatably mounted within bearing brackets 57 of the head plate 45. Adjacent the pinion 54 and keyed to the shaft 56 is a smaller pinion 58 the teeth of which intermesh with the teeth of a rack 59 of rectangular cross section which is slidably received within a rectangular guide aperture 60 of the head plate 45, and secured with its lower end by means of a screw 61 to the upper end of sleeve 32 for movement therewith. Both racks 52 and 59 are of sufficient length so that the teeth thereof remain in engagement with the teeth of their cooperating pinions 54 and 58, respectively, when the racks are in their lowermost positions.

The lower end of the filling tube 51 is slidably received within a circular aperture 62 of the bottom 35 of sleeve 32. The lower portion of the aperture 62 terminates into a tapered seat 63 adjacent the bottom face 35a of the sleeve 32. The filling tube 51 is further provided near its upper end with an elongated inlet aperture 64 and with a discharge aperture 66 in its side at its lower end. A plug 67 having an inclined upper surface 68 closes the lower end of the filling tube 51, except for said discharge aperture 66, and directs the liquid outwardly and downwardly through said aperture when the tube is in the filling position as shown in Fig. 2. The lower rim of the plug 67 is formed into an annular conical valve face 71 which engages the seat 63 and forms a liquid tight valve closing the bottom of the sleeve 32 and preventing flow of liquid therefrom when the filling valve is in non-filling position as shown in Fig. 1. The upper end of the sleeve 32 is open to the liquid in the tank 2 through the open upper end 72 of the housing 26 and the liquid passes from the tank through the housing 26, sleeve 32 and inlet 64 into the filling tube 51.

The operation of the filling valve is as follows: When the can 21 is lifted from non-filling position to filling position by the can holder 22 the rim 73 of the can is first brought into liquid tight sealing engagement with the gasket 39 of the lift plate 37 and thereupon the lift plate 37, sleeve 32, vent tube 46 and rack 59 are lifted against the tension of the coil spring 43 from the position shown in Fig. 1 to the position illustrated in Fig. 2. As soon as the sleeve 32 and rack 59 commence their upward movement, the rack 59 rotates the pinion 58 and shaft 56 in the direction of arrows 74 (Fig. 1) and since the pinion 54 is keyed to the shaft 56, it is rotated therewith and it causes downward movement of the rack 52 and filling tube 51 so that the lower end of the filling tube enters the can a distance proportionate to the amount of lift of the sleeve 32 whereby the outlet of the filling tube 51 is disposed near the bottom of the can.

As soon as the filling tube 51 moves downward the valve 71 opens and liquid from the tank 2 is discharged into the can through the outlet 66 in the filling tube which is rapidly placed into filling position with the outlet 66 near the bottom of the can whereby foaming is avoided. While the can is now filled with liquid from the tank 2, the displaced air is discharged from the can through the vent pipe 46 into the atmosphere. When the liquid reaches the level 75 (Fig. 2) it enters the vent tube 46 and fills the same to the level of the liquid in the tank 2 and thereupon the flow of liquid from tank 2 ceases with the liquid level remaining at 75 in the can.

As the can is now lowered from filling to non-filling position, the sleeve 32 and rack 59 are lowered therewith whereby rotation of pinions 58 and 54 in a direction opposite to the direction indicated by arrow 74 (Fig. 1) is effected, causing upward movement of the filling tube 51 from its position shown in Fig. 2 to its original position illustrated in Fig. 1. During this upward movement of the filling tube and while the can 21 remains in liquid tight engagement with the gasket 39, liquid again flows from tank 2 into can 21, since as the filling tube withdraws liquid takes its place. When the filling tube 51 is completely withdrawn, i. e., completely telescoped back into the sleeve 32 and housing 26, the valve 71 closes and further flow of liquid from the filling tube into the can is prevented. Thereupon during the final part of downward movement of the can, the rim 73 thereof disengages from the gasket 39 since the sleeve 32 is locked against further downward movement when the upward movement of the filling tube is arrested upon liquid tight engagement of valve 71 with the seat 63.

While the can is now withdrawn from the gasket 39 a sufficient distance below the lower end 35a of the sleeve 32 to clear the same, the liquid in the vent tube 46 flows into the can to fill the space previously occupied by the end of the sleeve 32 below the gasket 39 and the annular air space 76 (Fig. 2) around the same, but leaving the required head space in the can. By adjusting the lift plate 37 on the sleeve 32, i. e., by varying the distance the end of the sleeve 32 projects below the lift plate 37 and gasket 39, the head space in the can may be varied as desired.

The relative distances of movement of the sleeve 32 and filling tube 51 are determined by the ratio of the pinions 58 and 54. In the machine illustrated, which is a standard two inch lift machine, the can holder 22 has a vertical movement of approximately two and one half inches, and the largest can which can be handled in the machine is six inches high. Therefore in filling a six inch can the first half inch of lift brings the rim 73 of the can 21 into sealing contact with the gasket 39 and the remaining two inches of lift raise the sleeve 32 two inches and with a ratio of the pinions 58, 54 of slightly less than one to two, the filling tube 51 is lowered slightly less than four inches. The relative movement of the can and the filling tube is therefore slightly less than six inches which carries the lower end of the filling tube 51 to a position adjacent the bottom of the can as shown in Fig. 2.

If a can of less height than six inches is to be filled it is only necessary to lower the tank 2 and filling valve 4 a distance corresponding to the difference in height of the cans so that the filling tube in its lowermost position is adjacent the bottom of the can but does not touch the same; therefore the filling valve may be used for filling all sizes of cans up to six inch height. Obviously, if desired the filling valve may also be used for higher containers by varying the ratio of the pinions 54 and 58 accordingly.

In using the filling valve of the present construction the movement of the can and the can holder 22 is reduced to about one third of the movement heretofore necessary and the time for each filling cycle is thereby reduced accordingly so that the machine operates on a shorter cycle, and more cans per minute are filled by the machine.

It has heretofore further been necessary to remove the filling tube and to substitute a filling tube of different length when changing from cans of one height to another. This requires considerable time since the filling tube of each of the plurality of valves of the machine has to be changed. In using the filling valve of the present invention, however, it is only necessary to adjust the height of the valves with respect to the rim of the container to be filled in the manner as hereinbefore stated, which is accomplished in a single operation, i. e., by adjusting the height of the tank 2 on the shaft 1. It is therefore possible to quickly change from one can size to another by a simple single adjustment of the machine.

Since the filling valve of the present invention is a self contained unit, it can be substituted for existing filling valves in standard machines to provide them with a bottom fill valve which incorporates all the advantages enumerated herein.

While I have described the particular embodiment of the present invention, it will be understood that various changes and modifications may be made without departing from the spirit of the present invention and the scope of the appended claims.

Having thus described my invention, what I claim and desire to protect by Letters Patent is:

1. In a container filling machine having a vertically movable holder for raising and lowering a container to be filled and a liquid containing tank above said holder, a filling valve comprising a vertically movable filling tube having its upper end in communication with said tank and a discharge opening at its lower end, and means responsive to vertical movement of the container for lowering said tube into the container in addition to and simultaneous with the raising of said container toward said tube by said holder.

2. In a container filling machine having a vertically movable holder for raising and lowering a container to be filled and a liquid containing tank above said holder, a filling valve comprising a vertically movable filling tube having its upper end in communication with said tank and a discharge opening at its lower end, and differential speed actuating means responsive to vertical movement of the container for lowering said tube into the container simultaneously with the raising of the container by said holder and at a speed in excess of the speed of movement of said holder.

3. In a container filling machine having a vertically movable holder for raising and lowering a container to be filled and a liquid containing tank above said holder, a filling valve comprising a vertically movable sealing member positioned for contact with the top of the container, a vertically movable filling tube communicating with said tank and having a discharge opening at its lower end, and actuating means associated with said sealing member for lowering said tube into the container simultaneously with the raising of said sealing member.

4. In a container filling machine a vertically movable holder for raising and lowering a container to be filled and a liquid containing tank above said holder, a filling valve comprising a vertically movable sealing member positioned for contact with the top of the container, a vertically movable filling tube operatively associated with said sealing member, said tube communicating with said tank and having a discharge opening at its lower end, and differential speed actuating means operable upon raising of said sealing member by the container for lowering said tube into the container a distance in excess of the movement of said sealing member.

5. In a container filling machine having a vertically movable holder for raising and lowering a container to be filled and a liquid containing tank above said holder, a filling valve comprising a vertically movable sealing member positioned for contact with the top of the container, a vertically movable filling tube communicating with said tank and having a discharge opening at its lower end, and means between said sealing member and said filling tube for moving said tube downwardly into the container simultaneously with the upward movement of said sealing member.

6. In a container filling machine having a vertically movable holder for raising and lowering a container to be filled and a liquid containing tank above said holder, a filling valve comprising a vertically movable sleeve, a sealing ring carried thereby for contact with the top of the container, a filling tube mounted within said sleeve for independent vertical movement with respect thereto, said filling tube being in communication with said tank and having a discharge opening at its lower end, and actuating means interconnecting the sleeve and tube whereby movement of said sleeve in one direction by said container causes simultaneously movement of said tube in the opposite direction.

7. In a container filling machine having a vertically movable holder for raising and lowering a container to be filled and a liquid containing tank above said holder, a filling valve comprising a vertically movable sleeve, a sealing ring carried thereby for contact with the top of the container, a filling tube mounted within said sleeve for independent vertical movement with respect thereto, said filling tube being in communication with said tank and having a discharge opening at its lower end, said tube and sleeve having cooperating valve faces at their lower ends to close the discharge opening of said tube, and differential speed actuating means intermediate said sleeve and said tube whereby movement of said sleeve by the container in one direction causes simultaneous accelerated movement of said tube in the opposite direction for a distance in excess of the distance of movement of said sleeve.

8. In a container filling machine having a vertically movable holder for raising and lowering a container to be filled and a liquid containing tank above said holder, a filling valve comprising a vertically movable sleeve having a closed lower end, means on said sleeve positioned for engagement by the container, a filling tube in communication with said tank mounted within said sleeve for independent vertical movement with respect thereto, the lower end of said tube extending through the lower end of said sleeve and having a discharge opening in its side at said lower end, cooperating tapered valve faces formed on the bottom of said sleeve and on said tube below the discharge opening, and means interconnecting sleeve and said tube whereby movement of said sleeve in one direction causes simultaneoeus movement of said tube in the opposite direction.

9. In a container filling machine having a vertically movable holder for raising and lowering a container to be filled and a liquid containing tank above said holder, a filling valve comprising a vertically movable sleeve open at its upper end to the liquid in said tank and having a closed lower end, a sealing ring carried by said sleeve for closing the top of the container, a vent tube fixed in said sleeve extending from the lower end thereof to a point above the level in said tank, a filling tube carried in said sleeve for vertical movement with respect thereto, said filling tube having an inlet aperture within said sleeve, the lower end of said filling tube extending slidably through the closed lower end of said sleeve and having a discharge aperture, means associated with said tube for directing fluid discharged therefrom through said discharge aperture in a downwardly inclined direction, and means operated by the upward movement of said sleeve by said container for moving the filling tube downwardly into the container a distance in excess of the upward movement of said sleeve.

10. In a container filling machine having a vertically movable holder for raising and lowering a container to be filled and a liquid containing tank above said holder, a filling valve comprising a vertically movable sealing member positioned for contact with the top of the container, a vertically movable filling tube communicating with said tank and having a discharge opening at its lower end, parallel toothed rack bars connected respectively with said sealing member and said tube, and pinion means engaging both said rack bars whereby upward movement of said sealing member causes downward movement of said tube.

11. In a container filling machine having a vertically movable holder for raising and lowering a container to be filled and a liquid containing tank above said holder, a filling valve comprising a tubular body extending downwardly from said tank, a vertically movable sleeve within said body, sealing means carried by said sleeve for closing the top of the container, a filling tube carried in said sleeve for vertical movement with respect thereto, said filling tube having an inlet communicating with the liquid in the tank and a discharge aperture at its lower end, a fixed guide plate mounted above said body, parallel toothed rack bars respectively secured to said sleeve and said tube and extending upwardly movably through said guide plate, and pinion means mounted in said guide plate and engaging both said rack bars whereby upward movement of said sleeve causes downward movement of said tube with respect thereto.

12. In a container filling machine having a vertically movable holder for raising and lowering a container to be filled and a liquid containing tank above said holder, a filling valve comprising a vertically movable sealing member positioned for contact with the top of the container, a vertically movable filling tube communicating with said tank and having a discharge opening at its lower end, parallel toothed rack bars connected respectively with said sealing member and said tube, and a pinion drive intermediate said rack bars comprising a small pinion intermeshing with the rack bar of said sealing member and a large pinion intermeshing with the rack bar of said tube whereby upward movement of said sealing member causes downward movement of said tube for a distance in excess of the distance of upward movement of the sealing member.

13. A filling valve comprising telescoping members, a filling tube slidably mounted on one of said members, and differential speed actuating means operatively associated with said telescoping members and tube for moving said tube relative to and at a speed in excess of the speed of relative movement of said members upon telescoping movement thereof.

14. A filling valve comprising telescoping members, a filling tube slidably mounted on one of said members, and differential speed actuating means operatively interconnecting said telescoping members and tube for moving said tube relative to and for a distance in excess of the distance of relative movement of said members upon telescoping movement thereof.

15. A filling valve comprising a housing, a sealing member movably mounted in said housing for sealing engagement with the mouth of the container to be filled, a filling tube slidably mounted in the sealing member and normally retracted into the same, and differential speed actuating means associated with said sealing member and tube for projecting the tube from the sealing member into the container a distance in excess of the movement of the sealing member upon movement of the sealing member relative to said housing.

16. A filling valve comprising a housing, a sleeve movably mounted in said housing and depending therefrom, said sleeve having a sealing portion on the lower end thereof for sealing engagement with the mouth of a container to be filled, a filling tube slidably mounted in said sleeve, and a pinion and rack mechanism cooperating with said tube and sleeve for projecting the tube from the sleeve into the container upon lifting of the sleeve by the container and for retracting said tube into the sleeve upon lowering of the same.

17. In a container filling machine having a vertically movable container support for raising and lowering a container to be filled, a filling valve, a movable filling tube within said valve, and means cooperatively associated with said valve and tube and responsive to the upward movement of the container for moving the filling tube downwardly with respect to said valve into the container upon upward movement of the container by said support toward said valve.

18. A filling valve comprising a pair of telescoping members, a filling tube slidably mounted on one of said members, and means operatively connecting said tube with the telescoping member on which it is mounted for moving the tube relative to said members when the members are telescoped, said operating means being adapted to move the tube at a speed in excess of the speed of relative movement of said members upon telescoping movement thereof.

19. A filling valve comprising telescoping members, a filling tube slidably mounted on one of said members, and means operatively connecting said tube with the telescoping member on which it is mounted for moving the tube relative to said members when said members are telescoped, said operating means being adapted to move the tube at a speed and for a distance in excess of the speed and distance of relative movement of said members upon telescoping movement thereof.

20. In a container filling machine having a vertically movable container support for raising and lowering a container to be filled, a filling valve comprising a vertically movable member positioned for contact with the top of the container and movable upwardly thereby, a movable filling tube within said valve member, and means cooperatively associated with said valve member and said tube and responsive to the upward movement imparted to the valve member by the container to cause the filling tube to travel downwardly into the container.

CHARLES E. KERR.

REFERENCES CITED

The following references are of record in the file of this patent:

UNITED STATES PATENTS

| Number | Name | Date |
| --- | --- | --- |
| 2,218,911 | Hopkins | Oct. 22, 1940 |
| 1,029,681 | Height | June 18, 1912 |
| 956,285 | Champ | Apr. 26, 1910 |